Figure 1:
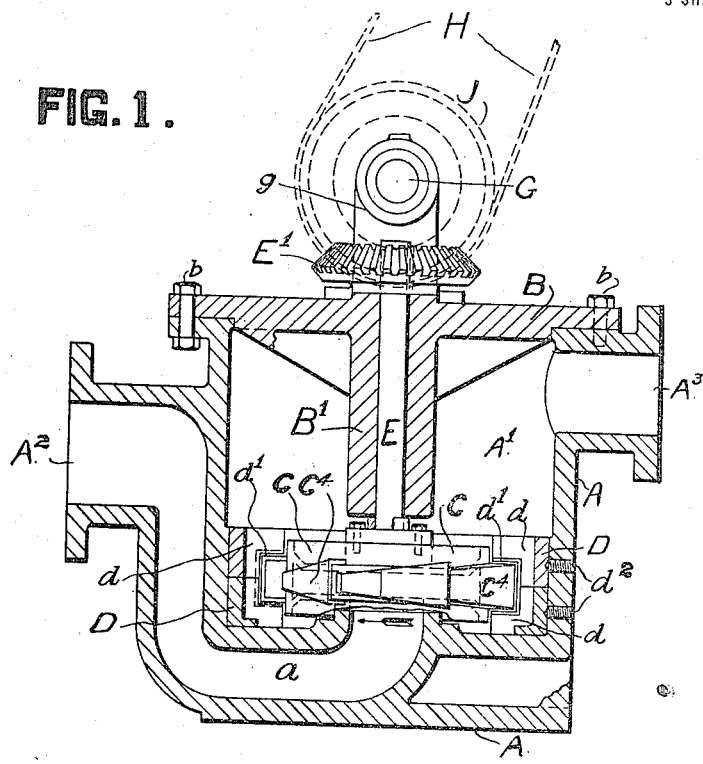

G. R. SCHUELER.
CENTRIFUGAL PUMP, BLOWER, AND EXHAUSTER.
APPLICATION FILED OCT. 16, 1917.

1,282,639.

Patented Oct. 22, 1918.
3 SHEETS—SHEET 1.

Inventor
George R Schueler
by Herbert W. Jenner
Attorney.

G. R. SCHUELER.
CENTRIFUGAL PUMP, BLOWER, AND EXHAUSTER.
APPLICATION FILED OCT. 16, 1917.
1,282,639.
Patented Oct. 22, 1918.
3 SHEETS—SHEET 2.
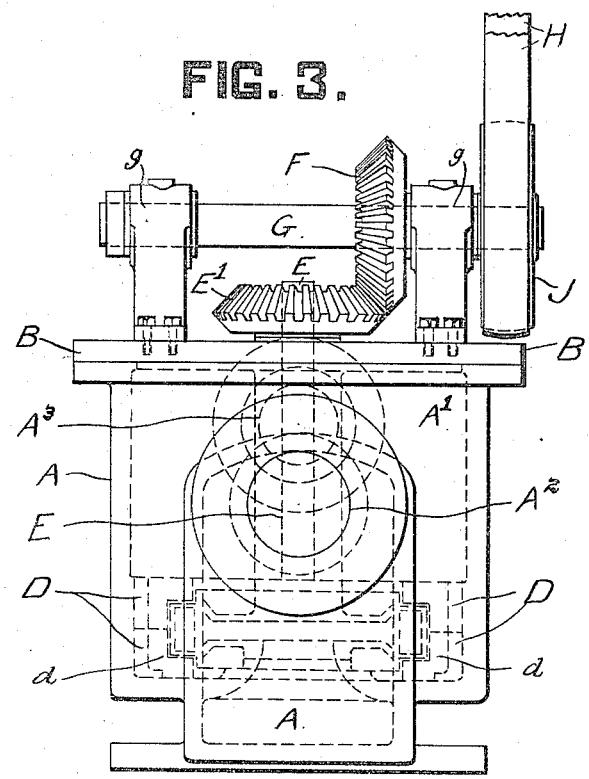
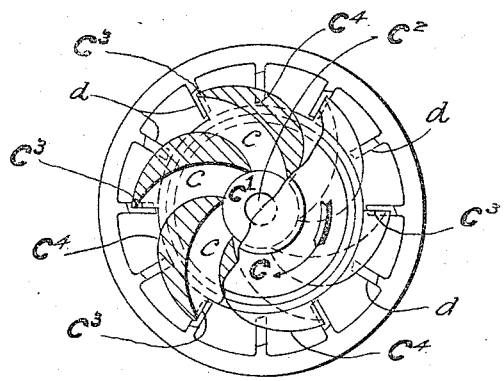

G. R. SCHUELER.
CENTRIFUGAL PUMP, BLOWER, AND EXHAUSTER.
APPLICATION FILED OCT. 16, 1917.
1,282,639.
Patented Oct. 22, 1918.
3 SHEETS—SHEET 3.
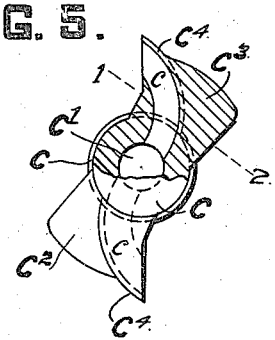
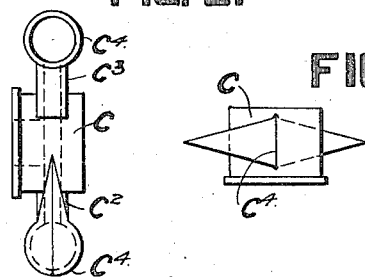
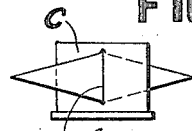
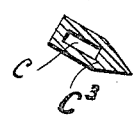
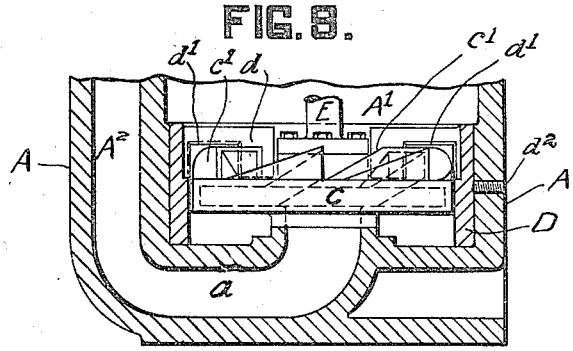
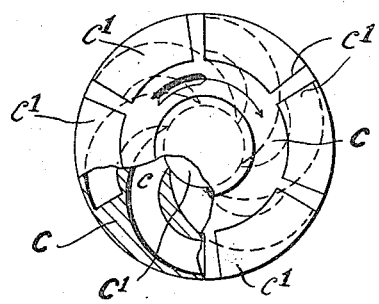

UNITED STATES PATENT OFFICE.

GEORGE RICHARD SCHUELER, OF KINGSTON-UPON-HULL, ENGLAND.

CENTRIFUGAL PUMP, BLOWER, AND EXHAUSTER.

1,282,639.  Specification of Letters Patent.  Patented Oct. 22, 1918.

Application filed October 16, 1917. Serial No. 196,845.

*To all whom it may concern:*

Be it known that I, GEORGE RICHARD SCHUELER, a citizen of the United States, but at present residing at the city and county of Kingston-upon-Hull, England, have invented certain new and useful Improvements in or Relating to Centrifugal Pumps, Blowers, and Exhausters, of which the following is a specification.

This invention has reference to that type of pump, exhauster, blower and the like, which consists of a casing in which is a rotor or revolving member which produces suction, or vacuum, and so induces or draws into the casing the water, or other liquid, semi-liquid, air or the like to be pumped, exhausted or delivered and which is discharged through an outlet or outlets in the casing.

The present invention has for its object to produce an improved pump, blower or the like of the kind mentioned, which shall be simple of construction, will to a very great extent be positive in its action, and by its construction will, when intended for use as a pump, keep itself primed, as the casing is so constructed that a charge of water always remains therein which makes starting of the device extremely simple, and will for initial priming require very little priming fluid, and which can be run at a low speed as compared with existing apparatuses for the same purpose but yet be capable of great efficiency for lifting or forcing.

My invention consists in its broad essentials of a casing having an inlet and an outlet, the inlet, particularly when the device is intended for pumping a liquid or semi-liquid, being provided with a bend or turn to provide a trap; a rotor consisting, according to one mode, of a circular body having a hollow center and a plurality of radial or curved passages which run from such hollow center to the outside or circumference of the body from which, or from the top of which body, the outlet ends of the passages project in the form of wedge, taper, cone or like shaped portions, or, according to another mode, having a plurality of hollow arms or members the passasges through which are in connection with the hollow center of the body of the rotor; of an arrangement of radial or tangential blades, vanes or plates each of which is provided with an opening just sufficiently large to allow the periphery, or the outer ends or arms of the rotor, to pass through as the rotor revolves; and of means for causing rotation of the rotor.

Figure 2:
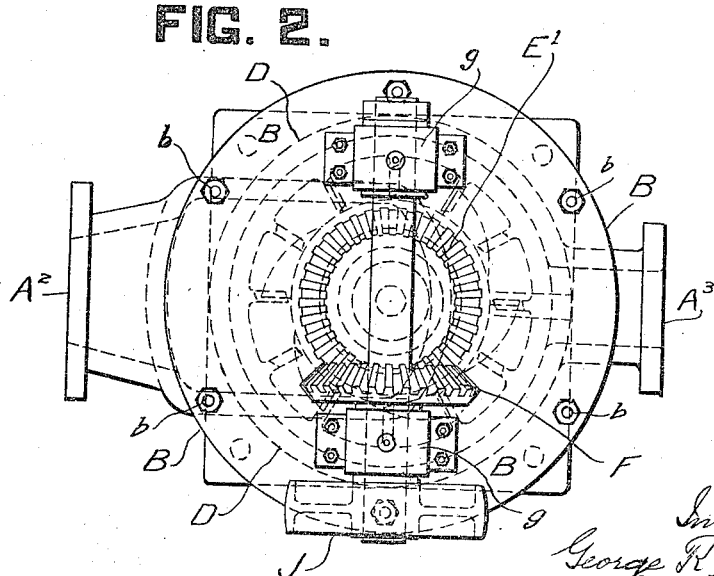

In the accompanying drawings Figure 1 represents a sectional side elevation of a pump, blower or exhauster in accordance with my invention, Fig. 2 a plan view and Fig. 3 an end elevation of Fig. 1. Fig. 4 is a plan view of the bottom ring provided with portions of the ribs, vanes or plates and showing one form of rotor partly in section, Fig. 5 is a plan view of a modified form of rotor partly in section, Fig. 6 is a view looking at Fig. 5 in a right hand direction, and assuming Fig. 5 to be complete, Fig. 7 a view looking upwardly at Fig. 5 and Fig. 8 a section on the line 1—2 of Fig. 5, assuming Fig. 5 to be complete. Fig. 9 is a sectional elevation of a portion of the casing and shows a slightly modified form of rotor, and ribs, vanes or plates, and Fig. 10 is a plan view of the rotor partly in section.

Referring first to Figs. 1 to 4 inclusive of the drawings, A represents a casing having a circular interior $A^1$, and inlet $A^2$ and an outlet $A^3$, the inlet $A^2$ being shown as having a bend $a$ in it (Fig. 1), B is the top or cover portion of the casing secured by any suitable means to the top of the casing, the means shown in the drawings consisting of bolts $b$.

The rotor is in the form of a circular body C of a suitable thickness, the center $C^1$ of which is hollow, a hole $C^2$ (or holes) being formed in the bottom of the center $C^1$, a number of passages $c$, preferably of curved configuration, running from such hollow center to the outside or circumference of the hollow body, the mouths or delivery ends $C^3$ of such passages being in the form of wedge, taper, cone or like shaped enlargements $C^4$ of the circumference of the hollow body portion, such mouths or outlets being at the back of the said enlargements, as shown more clearly at Figs. 1 and 4.

D is a ring fitted on the bottom of the circular interior or chamber $A^1$ of the casing A, said ring being provided on its inner face with a number of radial ribs or vanes $d$ each having a portion removed or omitted to form an opening $d^1$ into which the outer edge or periphery of the rotor projects and in which it works as the rotor rotates. This ring is preferably made in two portions, the one fitting on the top of the other as shown in Fig. 1 to allow of ready fitting and removal of the rotor, half of each rib or vane being formed on one portion of the ring and half on the other portion. The walls of the opening in each rib or vane are beveled in such a manner as to increase the size of the opening from back to front, that is, in the direction in which the rotor revolves, such direction being indicated by the arrow in the bend $a$ of the inlet in Fig. 1 and on the rotor in Fig. 4. The portions forming the ring D may be secured in the circular chamber of the casing by any suitable means, set screws $d^2$ being the means shown in the drawings. If desired, the bottom portions of the ribs or vanes may be formed integral with the casing A and on the interior thereof, and the top portions only formed on a ring fitted in the chamber of the casing in such a manner as to complete such ribs or vanes.

The rotor C may be driven by any suitable means, the means shown consists in securing a vertical shaft E to the top of the rotor, said shaft passing up through a tubular portion $B^1$ of the top or cover portion B and through such top or cover portion itself, the said shaft carrying a bevel or like wheel $E^1$ which gears with a corresponding wheel F on a cross-shaft G rotatable in bearings $g$, $g$, carried by the top or cover plate B, the cross-shaft being driven from a line of shafting or other suitable source of power, or driven by a belt or the like H which drives a pulley J or the like keyed or otherwise secured on the said cross-shaft.

Referring to Figs. 5 to 8 of the drawings which show a modified form of rotor, C is the body portion, $C^1$ a vertical hole of a suitable diameter in the center of such body portion, said hole extending from the bottom into the body portion for a suitable distance but not entirely through it, $C^2$ and $C^3$ are two arms or members of wedge or like shape and $c$, $c$ are two curved passages running from the hole $C^1$ in the body portion to the extremities $C^4$ of the arms or members $C^2$, $C^3$ and formed in the thickest portions of such arms or members.

In the modification shown at Figs. 9 and 10 of the drawings, the passages $c$ from the central hole $C^1$ in the body C of the rotor are carried up at an angle to the top of the body C on which the outlet ends stand up in the form of inclined tunnel-like portions $c^1$ as shown. The ring D on which are formed the ribs or vanes $d$ is in this case preferably in one piece in place of being in two separate portions as before described, the openings $d^1$ in the ribs or vanes of such ring being formed in the bottom of such ribs or vanes in place of in the inner edges, the body of the rotor rotating under such ribs or vanes but the tunnel-shaped outlets of the passages passing through such openings. With this arrangement the rotor can first be placed in position and the ring D dropped into and secured in position afterward.

The chief object of carrying the passages up to the top of the rotor as described, is, when the apparatus is used for pumping or the like, air, gas or the like, the air, gas or the like has free access to the surface of the priming fluid in which the rotor rotates.

In operation, as the motor rotates, the outer ends of the mouths of the passages in the rotor by passing through the openings in the fixed ribs or vanes in the casing, as a result of their shape, spread the fluid or the like in an outward direction between the said ribs or vanes which form obstructions to the fluid and prevent it from traveling around with the rotor with the result that after any mouth or outlet of the rotor has passed through an opening in a rib or vane and has displaced some portion of the fluid or the like, such fluid or the like by being in motion in an outward direction cannot immediately change its motion to flow in the direction of the rotation of the rotor and so cannot reënter the mouth of the passage through the rotor and consequently produces a vacuum, or a partial vacuum, behind such mouth, and as this result is produced by the mouth of each opening or passage in the rotor as it passes through the opening in each rib or vane, the resultant vacuum causes the fluid or the like to be drawn continuously into the rotor through the inlet to the hollow center portion from which it passes through the passages and is delivered through the mouths into the casing and passes up between the ribs or vanes and is discharged through the outlet or outlets of the casing, provided for the purpose, the wedge, taper, cone or other suitably shaped projections or extensions which form the outlet or delivery ends of the passages in the rotor, by their action in forcing the fluid out of their path owing to their shape, as the rotor rotates, produce a certain positive force which causes the discharge of the fluid or the like through the outlet or outlets of the casing.

I claim:—

1. In a machine of the class described, a casing provided with an outlet chamber, an inlet, and a series of serrated vanes located in the said outlet chamber and arranged radially of the said inlet; and a rotor journaled in the outlet chamber and projecting into the serrations or openings of the said vanes, said rotor being provided with delivery passages which extend from the central part of its underside to its periphery and which communicate with the said inlet.

2. In a machine of the class described, a casing provided with an outlet chamber and an inlet, a ring secured in the outlet chamber and provided with a series of serrated vanes arranged radially of the said inlet; and a rotor journaled in the outlet chamber and projecting into the serrations or openings of the said vanes, said rotor being provided with delivery passages which extend from the central part of its underside to its periphery and which communicate with the said inlet.

3. In a machine of the class described, a casing provided with an outlet chamber at its upper part and having an inlet at its lower part and an inlet passage which extends laterally and upwardly from the said inlet and forms a trap for liquid; and a rotor journaled in the outlet chamber and projecting into the serrations or openings of the said vanes, said rotor being provided with delivery passages which extend from the central part of its underside to its periphery and which communicate with the said inlet.

4. In a machine of the class described, a casing provided with an outlet chamber at its upper part, an inlet at its lower part, and a series of vanes located in the outlet chamber and arranged radially of the said inlet and provided with serrations or openings in their lower edges; and a rotor journaled in the outlet chamber and provided with tubular portions which project into the said serrations or openings and which extend downwardly at an angle to the horizontal and which communicate with the said inlet.

In testimony whereof I affix my signature in presence of two witnesses.

GEORGE RICHARD SCHUELER.

Witnesses:
WILLIAM MELVIN,
LOUIS E. KIPPAX.

Copies of this patent may be obtained for five cents each, by addressing the "Commissioner of Patents, Washington, D. C."